(12) United States Patent
Clark

(10) Patent No.: US 6,598,068 B1
(45) Date of Patent: *Jul. 22, 2003

(54) METHOD AND APPARATUS FOR AUTOMATICALLY MANAGING CONCURRENT ACCESS TO A SHARED RESOURCE IN A MULTI-THREADED PROGRAMMING ENVIRONMENT

(75) Inventor: Peter D. Clark, Cupertino, CA (US)

(73) Assignee: Sun Microsystems, Inc., Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 938 days.

(21) Appl. No.: 08/582,661

(22) Filed: Jan. 4, 1996

(51) Int. Cl.$^7$ .................................................. G06F 9/50
(52) U.S. Cl. ........................................................ 709/104
(58) Field of Search ................................ 395/670, 671, 395/672, 673; 709/100–108; 710/200, 220, 240

(56) References Cited

U.S. PATENT DOCUMENTS 5,450,592 A * 9/1995 McLeod ..................... 709/100
5,630,136 A * 5/1997 Davidson et al. ........... 709/106
5,644,768 A * 7/1997 Periwal et al. .............. 709/102

OTHER PUBLICATIONS

Richter, Jeffrey, "Advanced Windows NT" Microsoft Press, pp. 173–288, 1993.*
Walmer et al, A Programmer's Guide To The Mach Ser Environment, Carnegie Melon University 11/89.*
Thread Manager, inside Macintosh, Apple Computer Feb. 3, 1995 pp. (1–1)–(1–48).*

\* cited by examiner

Primary Examiner—St. John Courtenay, III
(74) Attorney, Agent, or Firm—Beyer Weaver & Thomas, LLP

(57) ABSTRACT

A method and apparatus for managing how threads of a multi-threaded computer program share a resource is provided One thread of the program is given priority over other threads of the program by granting to the thread possession of the lock associated with the resource regardless of whether the thread currently requires use of the resource. The other threads are designed to indicate to the priority thread when they require use of the resource. If the priority thread is done using the resource and detects that another thread is waiting to use the resource, the priority thread releases the resource lock for the resource. After releasing the lock for the resource, the priority thread automatically requests the resource lock. After using the resource, any non-priority thread releases the resource lock to the priority thread if the priority thread has requested the resource, without regard to whether any other threads may be waiting for the resource. According to one embodiment, a timer mechanism is used to cause the priority thread to periodically check whether any threads are waiting to use the resource.

23 Claims, 7 Drawing Sheets

| MAIN THREAD | WORKER THREAD 1 | WORKER THREAD 2 | TIME |
|---|---|---|---|
| IN EVENT LOOP | REQUESTS LOCK | | T0 |
| RELEASES LOCK | | REQUESTS LOCK | T1 |
| REQUESTS LOCK | ACQUIRES LOCK | | T2 |
| | PERFORMS WORK | | T3 |
| | RELEASES LOCK | | T4 |
| ACQUIRES LOCK | | | T5 |
| IN EVENT LOOP | REQUESTS LOCK | | T6 |
| RELEASES LOCK | | | T7 |
| REQUESTS LOCK | | ACQUIRES LOCK | T8 |
| | | PERFORMS WORK | T9 |
| | | RELEASES LOCK | T10 |
| ACQUIRES LOCK | | | T11 |
| IN EVENT LOOP | | | T12 |
| RELEASES LOCK | | | T13 |
| REQUESTS LOCK | ACQUIRES LOCK | | T14 |
| | PERFORMS WORK | | T15 |
| | RELEASES LOCK | | T16 |
| ACQUIRES LOCK | | | T17 |
| IN EVENT LOOP | | | T18 |

| MAIN THREAD | WORKER THREAD 1 | WORKER THREAD 2 | TIME |
|---|---|---|---|
| IN EVENT LOOP | | | T0 |
| RELEASES LOCK | | REQUESTS LOCK | T1 |
| | REQUESTS LOCK | ACQUIRES LOCK | T2 |
| | | PERFORMS WORK | T3 |
| | | RELEASES LOCK | T4 |
| | ACQUIRES LOCK | | T5 |
| | PERFORMS WORK | REQUESTS LOCK | T6 |
| | RELEASES LOCK | | T7 |
| REQUESTS LOCK | | ACQUIRES LOCK | T8 |
| | REQUESTS LOCK | PERFORMS WORK | T9 |
| | | RELEASES LOCK | T10 |
| ACQUIRES LOCK | | | T11 |
| IN EVENT LOOP | | | T12 |
| RELEASES LOCK | | | T13 |
| REQUESTS LOCK | ACQUIRES LOCK | | T14 |
| | PERFORMS WORK | | T15 |
| | RELEASES LOCK | | T16 |
| ACQUIRES LOCK | | | T17 |
| IN EVENT LOOP | | | T18 |
| RELEASES LOCK | | | T19 |

Figure 1

| MAIN THREAD | WORKER THREAD 1 | WORKER THREAD 2 | TIME |
|---|---|---|---|
| IN EVENT LOOP | REQUESTS LOCK | | T0 |
| RELEASES LOCK | | REQUESTS LOCK | T1 |
| REQUESTS LOCK | ACQUIRES LOCK | | T2 |
| | PERFORMS WORK | | T3 |
| | RELEASES LOCK | | T4 |
| ACQUIRES LOCK | | | T5 |
| IN EVENT LOOP | REQUESTS LOCK | | T6 |
| RELEASES LOCK | | | T7 |
| REQUESTS LOCK | | ACQUIRES LOCK | T8 |
| | | PERFORMS WORK | T9 |
| | | RELEASES LOCK | T10 |
| ACQUIRES LOCK | | | T11 |
| IN EVENT LOOP | | | T12 |
| RELEASES LOCK | | | T13 |
| REQUESTS LOCK | ACQUIRES LOCK | | T14 |
| | PERFORMS WORK | | T15 |
| | RELEASES LOCK | | T16 |
| ACQUIRES LOCK | | | T17 |
| IN EVENT LOOP | | | T18 |

Figure 3

METHOD AND APPARATUS FOR AUTOMATICALLY MANAGING CONCURRENT ACCESS TO A SHARED RESOURCE IN A MULTI-THREADED PROGRAMMING ENVIRONMENT

FIELD OF THE INVENTION

The present invention relates to computer systems in which a single program may have multiple simultaneously-active threads, and more specifically, to a method and apparatus for managing access to a shared resource among multiple threads of the same program.

BACKGROUND OF THE INVENTION

During execution, processes use resources, such as memory, modems and printers. To take full advantage of resources, operating systems have been developed which allow multiple processes to share resources. Thus, instead of having to purchase one printer for every word processing program, users may purchase a single printer that may be shared by multiple concurrently-executing word processing programs.

Even though resources may be shared, as described above, many resources may not be used by more than one entity at any given time. Resources that cannot be reliably used by more than one entity at a time are referred to hereafter as single-access resources. For example, most printers are single-access resources because they are unable to print documents for more than one word processor at a time. Consequently, many operating systems include mechanisms that prevent two or more processes from simultaneously accessing single-access resources.

To more fully utilize the processing capacity of a computer system, some computer programs are designed to create "worker threads" to perform specific tasks. Worker threads are sequences of instructions that are part of the same program as the main program, but which may be scheduled for execution and executed independent of the execution of the main program. In multi-threaded systems, the main program itself is considered a thread (the "main thread").

The main thread of an event-driven multi-threaded program is typically responsible for generating visual feedback to let the user know that the user's interaction with user interface controls was detected by the system. For example, when a user selects a button on a control panel, it is typically the responsibility of the main thread of the program associated with the control panel to update the display to indicate that the button was pushed.

Upon initialization, the main thread of an event-driven multi-threaded program typically causes the windowing system to display user interface objects and then informs the operating system about the events in which it is interested (the "events-of-interest"). Such events typically include user interaction with the user interface objects.

After informing the operating system about the events-of-interest, the main thread becomes suspended by the operating system. Typically, the main thread remains suspended until one of the events-of-interest occurs. Upon the occurrence of an event-of-interest, the operating system places a message describing the event in a message queue associated with the multi-threaded program and activates the main thread. The main thread updates the display to provide visual feedback to the user. In addition, the main thread may itself perform some task associated with the selection of the button, or create a worker thread to perform the task.

Many threads of the same program may be active at the same time. If a computer system includes more than one processor, the various threads may even be executed concurrently. For example, when the main thread of multi-threaded program receives a message, it may create a new worker thread to process the message. When a second message arrives, the main thread may create a second worker thread to process the second message. The main thread, the first worker thread and the second worker thread may all be simultaneously active.

Each of the threads has its own resource requirements, determined by the task that the thread is to perform. For example, both the first and second threads described above may generate visual output to be displayed to a user. Therefore, both threads would require a connection to the window system.

In some environments, a multi-threaded program may be allocated only one connection to the window system. Therefore, the various threads of a program that desire to display information must share the connection. However, connections to window systems are typically single-access resources.

For example, assume that a first worker thread is in the process of sending display commands down the connection when a thread context switch occurs. After the thread context switch, the second worker thread starts sending display commands down the connection. When this occurs, the window system will only see garbage. The window system may respond to the garbage by killing the multi-threaded program or by crashing.

Therefore, just as multiple programs must be prevented from simultaneously accessing a shared single-access resource, so must threads of the same program. Unfortunately, most operating systems do not prevent concurrent access to resources by threads within a single program. Therefore, the responsibility of providing a mechanism for controlling the access to resources between threads typically falls on the application developer.

The standard solution to the problem of managing resource access between threads of a program is to provide a "lock" for each shared single-access resource. A typical lock is a data structure that has an owner, a state, and is associated with a shared resource. To guarantee that a single-access resource is accessed by one thread at a time, the application developer must design each thread to obtain control of the lock associated with the resource before the thread accesses the resource. If the lock is held by another thread, then the thread must wait until the lock is released. If not all threads respect this locking policy, then the single-access resource is at risk of being corrupted, or the program may crash, or both.

To provide such a locking mechanism, the application developer typically must write custom code for each of the threads of the program so that the threads will set and release the lock as needed. This is particularly difficult and tedious because the main thread (which in event-driven programs includes an event loop) is often part of a base library provided to application developers by third parties. Further, in some software development environments, the event loop is hidden from the application developer, so the application developers are unable to rewrite it to add lock-related functionality.

In conventional locking mechanisms, all threads (including the main thread) must request a lock when they need to use the resource associated with the lock, and release the lock when done using the resource associated with the lock. Thus, when the main thread has finished processing all of the messages in its message queue, the main thread releases the lock associated with the window system connection and then becomes suspended until more messages are available. While the main thread remains suspended, any active worker threads may gain control of the lock and access the corresponding resource. The operating system maintains a queue of all the threads that are waiting for a lock. When a lock is released by a thread, the operating system picks one of the threads in the queue associated with the lock and grants the lock to the selected thread.

FIG. 1 illustrates the timing of a particular set of operations in a computer system with a lock mechanism that is designed according to the approach described above. Referring to FIG. 1, at time T0 three threads are active: a main thread, a worker thread 1 and a worker thread 2. The main thread of the program initially holds the lock on the resource in question. At time T1, the main thread has finished using the resource associated with the lock, and therefore releases the lock. Also at time T1, the worker thread 2 requires to use the resource, and therefore requests the lock.

At times T2, the worker thread 2 acquires the lock and the worker thread 1 requests the lock. At times T3 and T4, the worker thread 2 performs work that requires use of the resource associated with the lock and releases the lock, respectively while worker thread 1 is suspended. At time T5, the worker thread 1 is activated by the operating system and acquires the lock.

At time T6, the worker 1 thread performs work using the resource. Also at time T6, the worker thread 2 once again requests the lock. At time T7, worker thread 1 releases the lock. At time T8, the main thread requests the lock and the worker thread 2 acquires the lock. At time T9, the worker thread 1 requests the lock and worker thread 2 performs work that uses the resource associated with the lock. At time T10, worker thread 2 releases the lock.

At time T11, the main thread acquires the lock. At time T12, the main thread uses the resource. At time T13, the main thread releases the lock. At time T14, the main thread requests the lock and the worker thread 1 acquires the lock. At time T15, the worker thread 1 performs work that requires the resource associated with the lock. At time 16, the worker thread 1 releases the lock. At times T17, T18 and T19, the main thread acquires the lock, uses the resource associated with the lock, then releases the lock, respectively.

The lock sharing strategy described above has the significant disadvantage that the program implemented by the various threads can appear non-responsive to the user. For example, if a worker thread gets control of a resource and holds the lock for a long time, the main thread will have to wait for its turn to hold the lock with all of the other threads that desire to use the resource. As mentioned above, the main thread is typically responsible for providing visual feedback in response to the user's interactions with the user interface of a program. Thus, the user may have to wait for a visual response to some action for as long as the main thread has to wait to get control of the connection to the windowing system. When the user does not get immediate visual feedback from the program, the user may begin to question the integrity of the program. Further, if there are multiple worker threads, the main thread may not even be at the top of the list to obtain the lock when the worker thread that currently holds the lock releases the lock.

Based on the foregoing, it is clearly desirable to provide a general and easy-to-use mechanism to automatically set and release locks on single-access resources from any thread without impairing the normal flow of application development or control within the program. It is further desirable to provide a mechanism to manage locks between threads that does not require application developers to rewrite or have access to the event loop of their programs. It is further desirable to provide a lock management strategy that minimizes the delay between a user-initiated event and the visual feedback associated with the user-initiated event.

SUMMARY OF THE INVENTION

A method and apparatus for managing how threads of a multi-threaded computer program share a resource is provided. One thread of the program is given priority over other threads of the program by granting to the thread possession of the lock associated with the resource regardless of whether the thread currently requires use of the resource. The other threads are designed to indicate to the priority thread when they require use of the resource. If the priority thread is done using the resource and detects that another thread is waiting to use the resource, the priority thread releases the resource lock for the resource. After releasing the lock for the resource, the priority thread automatically requests the resource lock. After using the resource, any non-priority thread releases the resource lock to the priority thread if the priority thread has requested the resource, without regard to whether any other threads may be waiting for the resource. According to one embodiment, a timer mechanism is used to cause the priority thread to periodically check whether any threads are waiting to use the resource.

According to one aspect of the invention, a method for sharing a resource between a plurality of threads of a multi-threaded program is provided. According to the method, a first thread of the plurality of threads acquires a resource lock associated with the resource and holds the resource lock until detecting that another thread of the plurality of threads requires use of the resource. In response to detecting that another thread of the plurality of threads requires use of the resource, the first thread finishes any use of the resource, releases the resource lock allowing the other tread to access the shared resource, and requests the resource lock. Each thread of the plurality of threads other than the first thread is designed to release the resource lock to the first thread after finishing any use of the resource.

According to another aspect of the invention, a method for indicating to a first thread that holds a resource lock associated with a resource that one or more other threads require use of the resource is provided. According to the method, a timer is initiated and the first thread is periodically activated based on the timer. When the first thread is activated based on the timer, the first thread determines whether any other thread requires use of the resource by inspecting a value at a memory location. All threads other than the first thread are designed to update the value at the memory location when the threads require use of the resource.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a timing diagram that illustrates a typical sequence of operations in locking scheme that uses a conventional lock sharing strategy;

FIG. 3 is a timing diagram that illustrates a sequence of operations in a system that uses an improved lock sharing strategy according to an embodiment of the invention;

DETAILED DESCRIPTION OF THE PREFERRED EMBODIMENT

HARDWARE OVERVIEW

A method and apparatus for sharing resources between threads of a multi-threaded program is described. In the following description, for the purposes of explanation, numerous specific details such as are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 2:
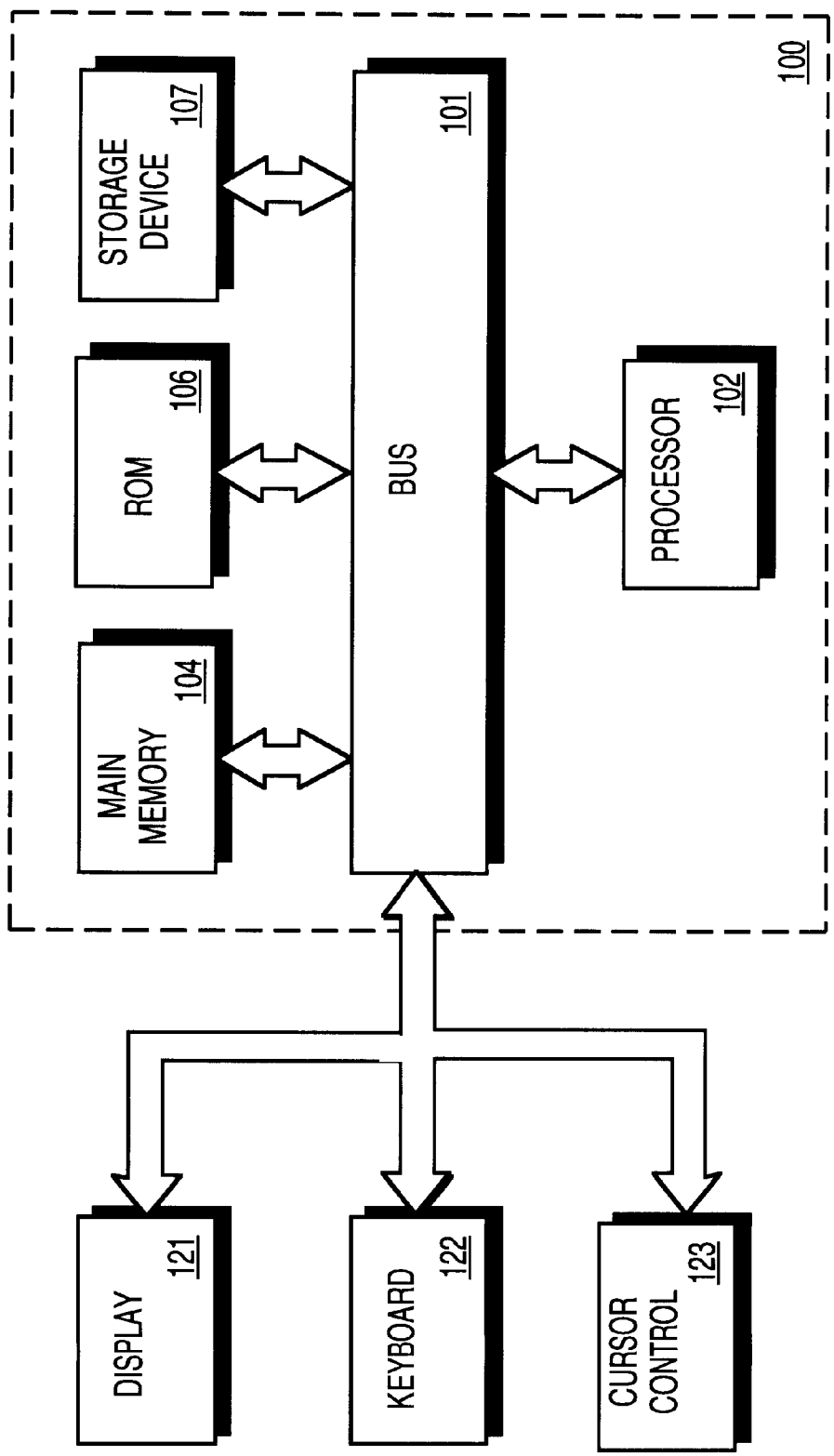
FIG. 2 is a block diagram of a computer system that may be configured to implement an embodiment of the present invention.

Referring to FIG. 2, the computer system upon which the preferred embodiment of the present invention can be implemented is shown as 100. Computer system 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

In the currently preferred embodiment, the present invention is related to the use of computer system 100 to execute a multi-threaded program in which the threads share a resource according to the techniques that shall be described in greater detail below.

IMPROVED LOCK PASSING STRATEGY

As mentioned above, the main thread is typically the portion of program that controls interaction with the user. The longer the main thread has to wait to use the connection to the windowing system, the less responsive the program appears to the user. Therefore, the present invention provides a lock control strategy that gives the main thread priority over other threads with respect to the resource associated with the visual display. Thus, when a user clicks on a button, the program will give the user immediate visual feedback, making the program feel "responsive".

According to the preferred lock-passing strategy, the main thread maintains control of the lock associated with the visual output resource at all times unless specifically requested to release the lock. Thus, even when the main thread is in a suspended state, the main thread will hold the lock if no other thread has requested the lock. This is a significant deviation from the conventional locking passing shown in FIG. 1, where all threads release the lock as soon as they have completed the task that requires the use of the resource associated with the lock.

According to the lock passing techniques provided by the present invention, when a worker thread requires the use of the resource, the worker thread communicates to the main thread that the worker thread desires access to the resource. The main thread may, at its convenience, release the lock associated with the resource to the worker thread. Thus, if the main thread is using the resource, the main thread will finish its task that requires the resource before releasing the lock associated with the resource. If the main thread is not using the resource, then the main thread may immediately release the lock associated with the resource upon receipt of the indication that a worker thread desires to use the resource.

When the main thread releases the lock, the worker is able to acquire the lock and access the resource. However, as soon as the main thread releases the lock, the main thread requests the lock. When the worker thread finishes using the resource, the worker thread releases the lock back to the main thread, without regard to whether other threads have also requested control of the lock.

FIG. 3 illustrates the timing of a particular series of operations in a system that implements the lock passing techniques described above. Referring to FIG. 3, at time T0 the main thread holds the lock and worker thread 1 requests the lock. At time T1, the main thread releases the lock and the worker thread 2 requests the lock. At time T2, the main thread requests the lock and the worker thread 1 acquires the lock. Note that the main thread's request for the lock is automatic after the release of the lock, and does not depend on whether the main thread has any current need to use the resource associated with the lock.

At time T3, the worker thread 1 performs the work that uses the resource associated with the lock, and then releases the lock at time T4. At time T5, the main thread acquires the lock. Note that the main thread acquired the lock even though worker thread 2 has been waiting for the lock longer than the main thread. The main thread's request for the lock is always given priority over all other outstanding requests.

The main thread performs any work that requires the resource at time T6. Also at time T6, worker thread 1 requests the lock. The main thread finishes using the resource and releases the lock at time T7. Note that this release of the lock is not automatically performed in response to the main thread finishing its use of the resource. The main thread only releases the lock when both (1) the main thread is done using the resource, and (2) there is at least one outstanding request for another thread to use the resource. If there had been no outstanding request to use the resource at time T7, then the main thread would not have released the lock at time T7.

At time T8, the main thread requests the lock and the worker thread 2 acquires the lock. As mentioned above, the main thread requests the lock automatically every time the main thread releases the lock. At time T9, the worker thread 2 performs the task which uses the resource. At time T10, the worker thread 2 releases the lock. At time T11 the main thread acquires the lock. Note that the main thread acquired the lock ahead of worker thread 1 even though the request of worker thread 1 is older than the request of the main thread, and the main thread may not even need to use the resource associated with the lock.

At time T12 the main thread performs any work for which it requires the resource. At time T13 the main thread releases the lock. At time T14 the worker thread 1 acquires the lock. At time T15 the worker thread 1 performs the task that uses the resource. At time 16, the worker thread 1 releases the lock. At time T17 the main thread acquires the lock. At time T18 the main thread performs any operations that require the use of the resource.

The lock passing strategy thus described has the advantage over the conventional lock strategy in that the delays experienced by the main thread are reduced. The reduction in the delays experienced by the main thread result directly in the reduction of the delays experienced by the user. For example, if a user-event occurs at time T9, the main thread is able to respond to the event at time T12. In conventional thread passing strategies, the worker thread 1 would have acquired the lock at time T11, and the main thread would not have been able to respond to the user-event until the worker thread 1 had completed its task and released the lock on the resource.

DIRECTED LOCK TRANSFERS

In the lock passing strategy described above, the worker threads must be able to transfer control of the lock back to the main thread even when other threads are waiting for the resource lock. According to one embodiment of the invention, this is accomplished by using the state of a lock as a "keyhole" that determines which of the threads waiting for the lock may have access to the lock.

Specifically, each lock has some state associated with it. When a thread requests access to a lock, the thread may include a "key" with the request. When a thread releases the lock, the thread may specify the state that the lock is to assume after the release. When the lock is released in a particular state, the lock may only be obtained thereafter by threads that include the key that corresponds to the state of the locks. Threads that have requested the lock, but that have specified a key that does not correspond to the current state of the lock are not granted control of the lock.

According to one embodiment, both the state and the key may simply be numeric values. In such an embodiment, the lock management mechanism may be configured to only consider those requests that contain key values that match the state value associated with a lock.

Using the mechanism described above, worker threads are designed to release the lock in a first state to pass the lock to the main thread, while the main thread releases the lock in a second state to pass the lock to a worker thread. The worker threads are designed to send keys that correspond to the second state in their requests for the lock, while the main thread sends a key that corresponds to the first state when it requests the lock. Under these conditions, the lock can be passed back to the main thread after it is released by any worker thread, even if there are other worker threads that are waiting for it.

REGISTRATION-BASED COMMUNICATION MECHANISM

The lock sharing strategy described above requires a mechanism that provides communication between the worker threads and the main thread. Specifically, the main thread must be able to determine (1) when a worker thread desires the lock, and (2) when a worker thread that has held the lock has released the lock. According to one embodiment, the registration function provided by many operating systems may be used to provide the communication between the main thread and the worker threads required to implement the lock passing strategy described above.

Specifically, the main thread can register an entity indicator, such as a file descriptor or a socket on a network connection, with the operating system for each single-access shared resource. By registering an entity indicator, the main thread indicates to the operating system that an access to the entity associated with the entity indicator is an event-of-interest to the computer program. Thus, if the main thread registers a file descriptor, when the file associated with the file descriptor is accessed, the operating system will generate a message that identifies the event, place the message in the event queue of main thread, and activate the main thread.

Once the main thread has registered an entity indicator, the worker threads indicate to the main thread that they require a lock by performing the act that will activate the main thread. For example, if a file descriptor is used, then the worker thread will write to the file. If a network connection is used, then the worker thread will send something over the network connection.

In response to the action performed by the worker thread, the operating system will place a message indicative of the event in the event queue of the main thread and activate the main thread. Upon reading the message, the main thread will know that a worker thread desires to use the resource that corresponds to the registered entity.

The benefit of using file descriptors or network sockets to communicate between the threads is that the functionality required for the main thread to support this communication is minimal, since the registration mechanism is typically provided by the operating system. Thus, the main thread only needs to be designed to release the appropriate lock upon receiving the appropriate message.

The registration approach becomes inefficient when there are numerous worker threads. When there are numerous worker threads, the amount of processing resources required to perform the operation that triggers the event becomes significant. For example, writing to a file or a socket is a time expensive operation. When there are a lot of worker threads sharing a lock, a lot of time is consumed by the communication overhead rather than performing the actual tasks.

A second disadvantage of the registration approach is that operating systems will often limit the number of certain entity indicators that may be registered by a program. For example, the UNIX operating system allows each process to only register a limited number of a file, descriptors.

A third disadvantage is that the operating system will often limit the number of pending notifications that an entity indicator has been triggered. When there are numerous worker threads requesting access to the share resource by writing to a file or sending something down a network connection, the operating system will throw away old notifications to make room for new notifications. Consequently, the main thread may lose track of the number of waiting worker threads.

COUNTER-BASED COMMUNICATION MECHANISM

Figure 4:
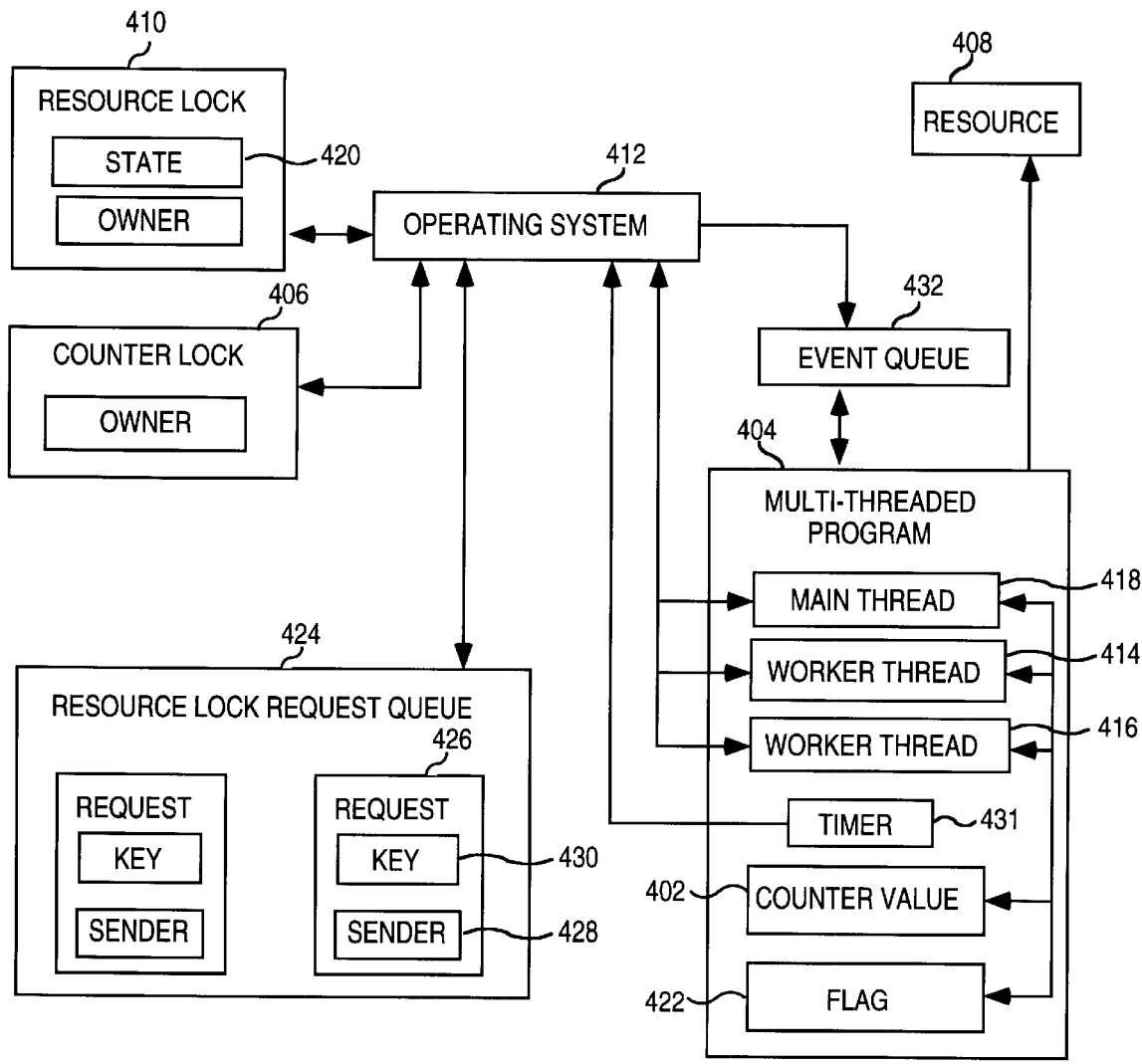
FIG. 4 is a block diagram illustrating a system that includes a resource sharing mechanism designed according to an embodiment of the invention.

FIG. 4 illustrates an embodiment of the invention in which a location for storing a counter value 402 is allocated in the process space of a multi-threaded program 404. A lock 406 is established for the counter location. The lock on the counter location shall be referred to hereafter as the "counter lock" 406, while the lock associated with the shared single-access resource 408 shall be referred to as the "resource lock" 410.

Figure 6:
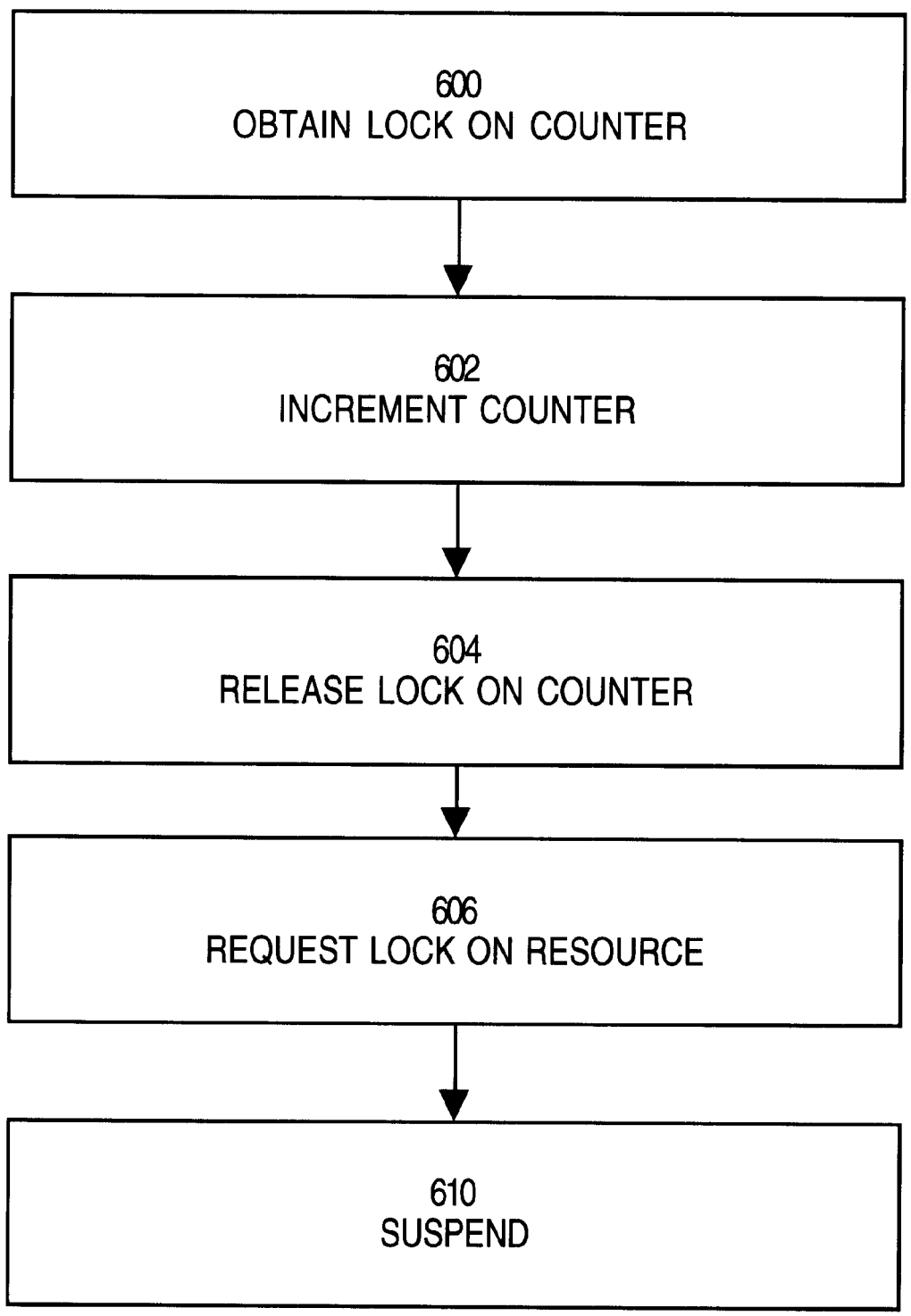
FIG. 6 is a flow chart illustrating the steps performed by a worker thread when it requires the use of a single-access resource.

Each worker thread 414 and 416 is designed to perform the steps illustrated in FIG. 6 when the worker thread wants to access the resource 408. For example, assume that worker thread 414 requires resource 408 to perform a particular task. At step 600, the worker thread 414 acquires the counter lock 406. At step 602, worker thread 414 increments the counter value 402 at the counter location. At step 604, the worker thread 414 releases the counter lock 406. At step 606, the worker thread 414 transmits a request for the resource lock 410. At step 610 the worker thread 414 suspends.

Figure 5:
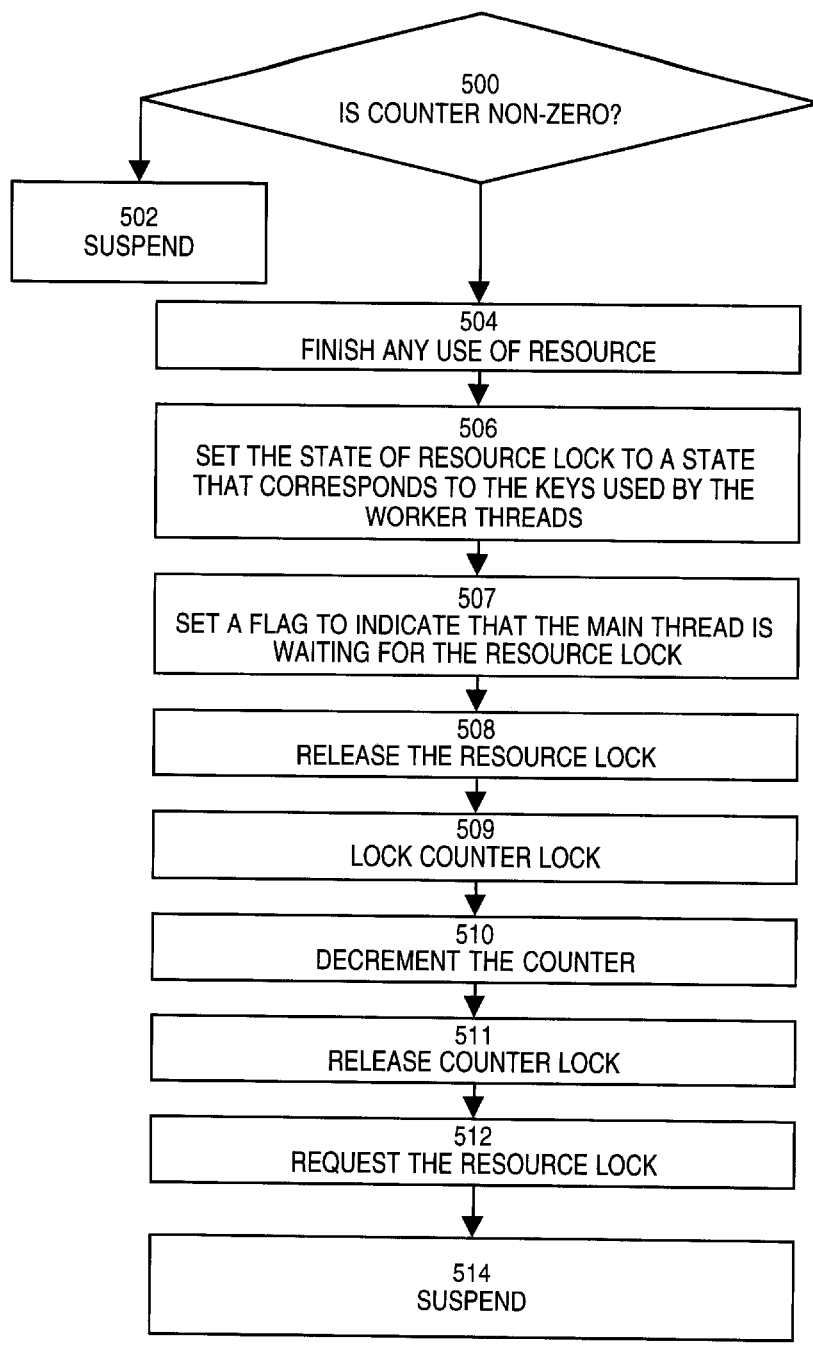
FIG. 5 is a flow chart illustrating the steps performed by a main thread when activated in response to a timer event.

The main thread 418 is designed to release the resource lock 410 to a worker thread when (1) the main thread is not using the resource 408 and (2) one or more worker threads have requested the resource lock 410. The steps performed by the main thread 418 are illustrated in FIG. 5. At step 500, the main thread 418 checks the counter 402 to determine if any worker threads have requested the resource lock 410. A non-zero value in the counter 402 is a signal to the main thread 418 that at least one worker thread 414 currently wants to use the single-access resource 408. If the counter 402 is zero, then the main thread suspends (i.e. resumes waiting for events) (step 502).

If the main thread 418 detects a non-zero value in the counter 402, the main thread 418 finishes any task that uses the resource 408. Step 504 involves performing any cleanup that must be performed before transferring the resource 408 to another task. For example, if the resource 408 is a connection to the windowing system, then step 504 would include flushing the window server connection. At step 506, the main thread 418 sets the state 420 of the resource lock 410 to a state that corresponds to the keys used by the worker threads 414 and 416. At step 507, the main thread 418 sets a flag 422 associated with the resource 408 to indicate that the main thread 418 is waiting for the resource lock 410. At step 508, the main thread 418 releases the resource lock.

At steps 509, 510 and 511, the main thread 418 acquires a counter lock, decrements the counter 402, and released the counter lock, respectively. At step 512 the main thread 418 requests the resource lock 410. The operating system 412 places the request 426 of the main thread 418 in the resource lock request queue 424. The request 426 includes sender information 428 that identifies the main thread 418 as the entity that issued the request 426 and a key value 430. The main thread 418 then suspends until its request for the resource lock 410 is granted.

When the operating system 412 detects that the resource lock 410 is free, the operating system 412 will grant the lock 410 to one of the worker threads that have requested the lock 410. Specifically, the operating system 412 selects a request in the resource lock request queue 424 and compares the key value in the request to the current state 420 of the resource lock 410. If the key value corresponds to the state 420 of the lock 410, then the operating system 412 grants the request. Otherwise, the operation system 412 selects another request and repeats the steps described above.

The operating system 412 continues this process until it encounters a request that has a key that corresponds to the state 420 of the resource lock 410. When the operating system 412 encounters a request that has a key that corresponds to the state 420 of the resource lock 410, the operating system 412 grants the resource lock 410 to the thread that sent the request and activates the thread.

Unfortunately, the main thread 418 may be suspended at the time that a worker thread 414 increments the counter 402. Further, no event-of-interest is generated when the worker thread 414 obtains the counter lock 406 or increments the counter 402, so the main thread 418 will not be activated if the main thread 418 is suspended. As a result, the efficiency of the system may be significantly reduced as the worker threads wait for the main thread 418 while the main thread 418 is suspended waiting for the occurrence of an event-of-interest.

To avoid such delays, the event loop of the main thread 418 is extended to include a timer 431 that causes the main thread 418 to periodically check for requests to surrender the resource lock 410. Specifically, the main thread 418 registers with the operating system 412 a timer 431. The timer 431 generates an event-of-interest at a fixed interval. When the timer 431 goes off, the operating system 412 places a message indicative of the timer 431 event in the event queue 432 of the main thread 418 and activates the main thread 418. Upon being activated by the timer event, the main thread 418 performs the steps described above with reference to FIG. 5.

Figure 7:
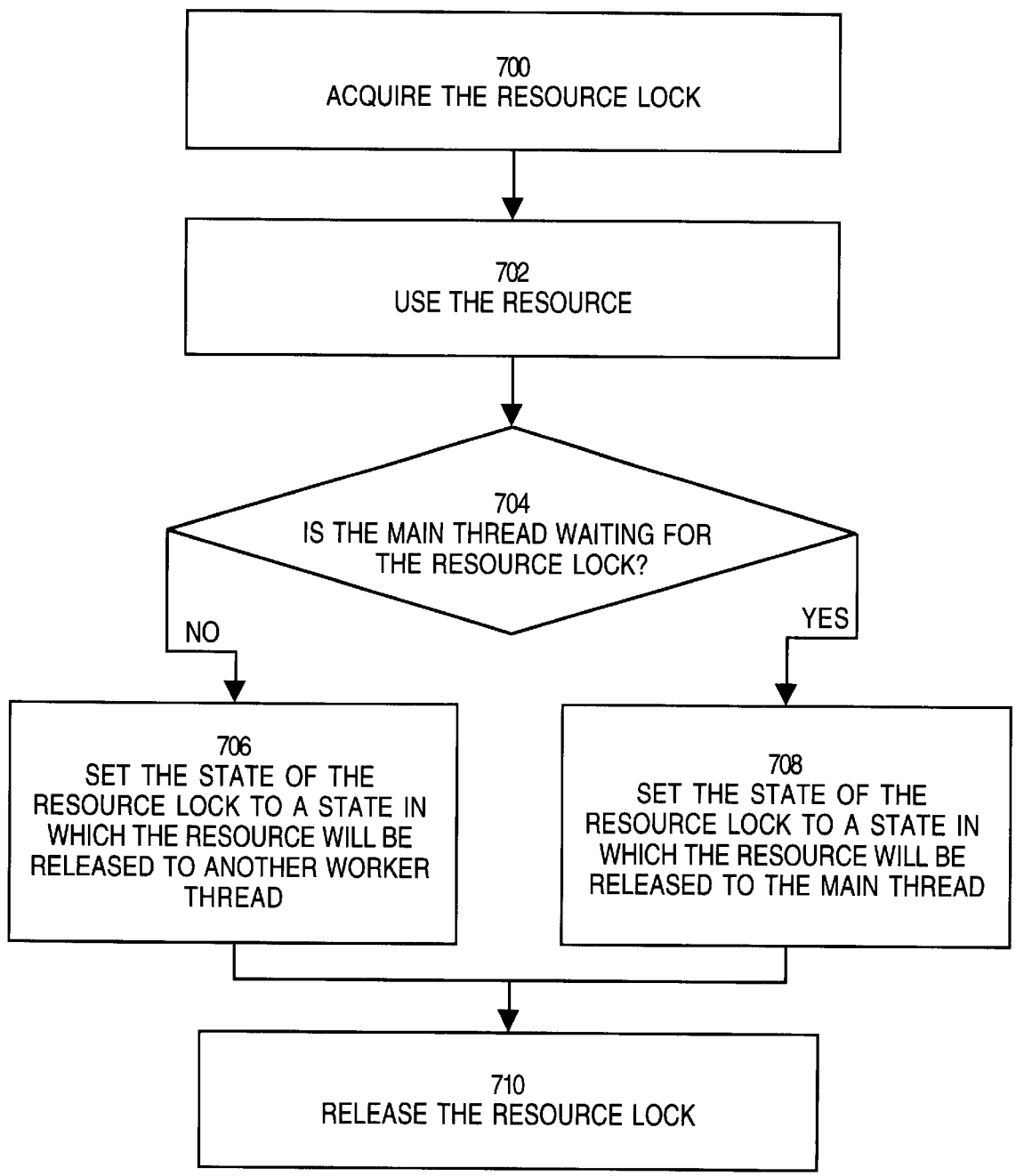
FIG. 7 is a flow chart illustrating the steps performed by a worker thread when granted the lock associated with a single-access resource.

As mentioned above, when the resource lock 410 is released by the main thread 418, the operating system 412 transfers ownership of the resource lock 410 to one of the worker threads that is waiting to use the single-access resource 408. The worker thread 414 that is granted ownership of the resource lock 410 performs the steps illustrated in FIG. 7.

At step 700, the worker thread 414 acquires the resource lock 410. At step 702, the worker thread 414 uses the resource 408 to perform a task. When it is through using the resource 408, the worker thread 414 performs whatever cleanup is necessary to prepare the resource 408 for use by another thread. At step 704, the worker thread 414 checks the flag 422 associated with the resource 408 to determine if the main thread 418 is waiting for the resource lock 410. If the flag 422 indicates that the main thread 418 is waiting for the resource lock 410, then the worker thread 414 sets the state 420 of the resource lock 410 to a state that matches the key 430 used by the main thread 418 (step 708), then releases the resource lock 410 (step 710). Otherwise, the worker thread 414 sets the state 420 of the resource lock 410 to a state that matches the key used by the worker threads (step 706), then releases the resource lock 410 (step 710).

When the worker thread 414 releases the resource lock 410, the operating system 412 selects another thread to get the lock. As mentioned above, the operating system 412 only considers requests that have keys consistent with the current state of the resource lock 410. Assuming that the worker thread 414 placed the resource lock 410 in a state that corresponds to the key used by the main thread 418, the main thread 418 will be the only thread with a key to match the state of the resource lock 410. Therefore, the operating system 412 will grant ownership of the resource lock 410 to the main thread 418.

After giving the resource lock 410 to the main thread 418, the operating system 412 activates the main thread 418. When the main thread 418 is activated, the main thread 418 sets the flag 422 associated with the resource 408 to indicate that the main thread 418 is not waiting for resource lock 410.

In some systems, the operating system 412 may not be designed to make the state/key comparison. In such systems, the operating system 412 may grant the resource lock 410 to another worker thread instead of the main thread 418 after a worker thread 414 has released the resource lock 410 even though the main thread 418 is waiting for the resource lock 410. The operating system 412 will then activate the worker thread to which the resource lock 410 was granted.

Under these conditions, each worker thread is designed to determine whether the flag 422 indicates that the main thread 418 is waiting for the resource lock 410 before actually using the resource 408. If the flag 422 indicates that the main thread 418 is waiting for the resource lock 410, then the worker thread 414 immediately releases the resource lock 410 without using the resource 408. This is repeated for all worker threads that are given the lock by the operating system 412 while the flag 422 indicates that the main thread 418 is waiting for the resource lock 410. Eventually the operating system 412 will grant the resource lock 410 back to the main thread 418.

The problems associated with the registration approach described above are avoided by the counter-based communication mechanism. Specifically, much of the processing overhead is avoided because no context switch is required for a worker thread 414 to notify the main thread 418 that it desires to use the resource 408. In addition, the application developer does not have to rewrite or even have access to the event loop, since the application framework provided to the application developer may already have the timer 431 functionality built into the event-loop.

DIRECT LOCK PASSING TO PREVENT DEADLOCK

At times, it may be necessary for the main thread 418 to pass ownership of the resource lock 410 directly to a worker thread to prevent deadlock. For example, the main thread 418 may make a call out to worker thread 414 in response to detecting a user-event. The main thread 418 will then suspend until the worker thread 414 completes its task. The worker thread 414 may make a call out to worker thread 416 to perform some task. The task to be performed by worker thread 416 may require the use of the resource 408. Worker thread 416 will then send a request for resource lock 410 and suspend until the resource lock 410 is granted.

The situation described above constitutes deadlock, since the main thread 418 will not become active to release the resource lock 410 until worker thread 414 has completed its task, worker thread 414 cannot complete its task until worker thread 416 completes its task, and worker thread 416 cannot complete its task until the main thread 418 releases the resource lock 410.

To avoid this problem, the main thread 418 explicitly releases the resource lock 410 before making a call out that may require a worker thread to use resource 408. After expressly releasing the resource lock 410, the main thread 418 requests the resource lock 410. The main thread 418 may then be suspended without foreclosing the use of resource 408 to other threads.

When the worker thread 416 that uses the resource 408 has finished using resource 408, the worker thread 416 sets the state 420 of the resource lock 410 to a state that corresponds to the key used by the main thread 418. When the worker thread 414 called by the main thread 418 has finished its task, the operating system 412 activates the main thread 418. When activated, the main thread 418 acquires control of the resource lock 410.

In the embodiments described above, various assumptions were made for the purposes of explanation. For example, it was assumed that the thread that is given priority over a resource is the main thread of a program. This may be the preferred when the resource is the connection to the window system and the main thread is responsible for generating visual feedback in response to user interaction. However, under other conditions it may be desirable to give a particular worker thread priority to a resource over all other threads, including the main thread. Therefore, the present invention is not limited to embodiments that give priority to the main thread.

In the foregoing specification, the invention has been described with reference to specific embodiments thereof. It will, however, be evident that various modifications and changes may be made thereto without departing from the broader spirit and scope of the invention. For example, rather than have the main thread decrement the counter when releasing the resource lock, the worker thread the receives the resource lock may decrement the counter before or after using the resource. The specification and drawings are, accordingly, to be regarded in an illustrative rather than a restrictive sense.

What is claimed is:

1. A method for sharing a resource between a plurality of threads of a multi-threaded program, the method comprising the steps of:

(A) causing a first thread of said plurality of threads to perform the steps of
   (A1) acquiring a resource lock associated with said resource;
   (A2) holding said resource lock until detecting that another thread of said plurality of threads requires use of said resource;
   (A3) in response to detecting that another thread of said plurality of threads requires use of said resource, performing the steps of
      (a) finishing any use of said resource;
      (b) releasing said resource lock; and
      (c) requesting said resource lock.

2. The method of claim 1 further comprising the steps of:
causing a second thread of said plurality of threads to indicate that said second thread desires to use said resource by incrementing a counter; and
causing said first thread to detect that another thread of said plurality of threads requires use of said resource by inspecting said counter.

3. The method of claim 2 further comprising the steps of:
causing said second thread to acquire a counter lock associated with said counter prior to incrementing said counter; and
causing said second thread to release the counter lock associated with said counter after incrementing said counter.

4. The method of claim 2 further comprising the steps of:
acquiring a counter lock associated with said counter;
decrementing said counter in response to said first thread releasing said resource lock; and
releasing said counter lock associated with said counter.

5. The method of claim 4 wherein said steps of acquiring said counter lock, decrementing said counter, and releasing said counter lock are performed by said first thread.

6. The method of claim 4 herein said steps of acquiring said counter lock, decrementing said counter, and releasing said counter lock are performed by said second thread.

7. The method of claim 1 further comprising the steps of:
initiating a timer;
causing said first thread to determine whether another thread of said plurality of threads requires use of said resource when a predetermined time interval elapses on said timer.

8. The method of claim 1 wherein:
said resource is a connection to a window system; and
the step of finishing any use of said resource includes flushing said connection to said window system.

9. The method of claim 1 further comprising the step of causing each thread of said plurality of threads other than said first thread to release said resource lock to said first thread after finishing any use of said resource.

10. The method of claim 9 further comprising the steps of:
causing said first thread to request the resource lock by transmitting a lock request that contains a first key; and
causing each thread of said plurality of threads other than said first thread to release said resource lock in a state that corresponds to said first key.

11. A method for indicating to a first thread that holds a resource lock associated with a resource that one or more other threads require use of said resource, the method comprising the steps of:
initiating a timer;
periodically activating said first thread based on said timer;
when said first thread is activated based on said timer, causing said first thread to determine whether any other thread requires use of said resource by inspecting a value at a memory location; and
causing any thread other than said first thread to update the value at the memory location when said thread requires use of the resource.

12. The method of claim 11 further comprising the steps of:
causing said first thread to suspend after inspecting said value at said memory location if said value indicates that no other threads require use of said resource;
causing said first thread to release said resource lock after inspecting said value at said memory location if said value indicates that another thread requires use of said resource.

13. The method of claim 12 further comprising the step of causing said first thread to request said resource lock in response to releasing said resource lock.

14. The method of claim 12 wherein:
the value at the memory location indicates how many threads other than said first thread are waiting to use said resource; and
the method further comprises the step of updating the value at the memory location in response to said first thread releasing said resource lock to indicate that one less thread is waiting to use said resource.

15. A computer-readable medium having stored thereon sequences of instructions which, when executed by a processor, cause the processor to manage how a resource is shared between a plurality of threads of a multi-threaded program, the sequences of instructions including instructions for:
(A) causing a first thread of said plurality of threads to perform the steps of
(A1) acquiring a resource lock associated with said resource;
(A2) holding said resource lock until detecting that another thread of said plurality of threads requires use of said resource;
(A3) in response to detecting that another thread of said plurality of threads requires use of said resource, performing the steps of
(a) finishing any use of said resource;
(b) releasing said resource lock; and
(c) requesting said resource lock.

16. The computer-readable medium of claim 15 further comprising instructions for causing each thread of said plurality of threads other than said first thread to release said resource lock to said first thread after finishing any use of said resource.

17. The computer-readable medium of claim 16 further comprising instructions for:
causing said first thread to request the resource lock by transmitting a lock request that contains a first key; and
causing each thread of said plurality of threads other than said first thread to release said resource lock in a state that corresponds to said first key.

18. The computer-readable medium of claim 15 further comprising instructions for:
causing a second thread of said plurality of threads to indicate that said second thread desires to use said resource by incrementing a counter; and
causing said first thread to detect that another thread of said plurality of threads requires use of said resource by inspecting said counter.

19. The computer-readable medium of claim 18 further comprising instructions for:
causing said second thread to acquire a counter lock associated with said counter prior to incrementing said counter; and
causing said second thread to release the counter lock associated with said counter after incrementing said counter.

20. The computer-readable medium of claim 15 further comprising instructions for:
initiating a timer;

causing said first thread to determine whether another thread of said plurality of threads requires use of said resource when a predetermined time interval elapses on said timer.

21. A computer system comprising:

memory storing
- a resource lock associated with a resource, and
- a value;

at least one processor executing a multi-threaded program;

said multi-threaded program including
- a first thread that holds the resource lock associated with the resource, and
- one or more other threads;

a timer;
- said at least one processor being configured to indicate to the first thread that one or more other threads require use of said resource by:
- periodically activating said first thread based on said timer;
- when said first thread is activated based on said timer, causing said first thread to determine whether any other thread requires use of said resource by inspecting the value;
- causing any thread other than said first thread to update the value when said at least one processor is further configured to:
- cause said first thread to suspend after inspecting said value at said memory location if said value indicates that no other threads require use of said resource:
- cause said first thread to release said resource lock after inspecting said value at said memory location if said value indicates that another thread requires use of said resource.

22. The computer system of claim 21 wherein the at least one processor is further configured to cause said first thread to request said resource lock in response to releasing said resource lock.

23. The computer system of claim 21 wherein:
- the value indicates how many threads other than said first thread are waiting to use said resource; and
- the at least one processor is further configured to update the value in response to said first thread releasing said resource lock to indicate that one less thread is waiting to use said resource.

* * * * *